United States Patent
Antonsson

(10) Patent No.: US 11,595,412 B2
(45) Date of Patent: Feb. 28, 2023

(54) DETECTING MANIPULATION OF DATA ON A CAN BUS

(71) Applicant: Volvo Car Corporation, Gothenburg (SE)

(72) Inventor: Anders Antonsson, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 185 days.

(21) Appl. No.: 17/068,868

(22) Filed: Oct. 13, 2020

(65) Prior Publication Data

US 2021/0120017 A1  Apr. 22, 2021

(30) Foreign Application Priority Data

Oct. 17, 2019  (EP) .................................... 19203744

(51) Int. Cl.
*H04L 29/06* (2006.01)
*G06F 21/60* (2013.01)
*G01R 27/16* (2006.01)
*H04L 9/40* (2022.01)

(52) U.S. Cl.
CPC .......... *H04L 63/1416* (2013.01); *G01R 27/16* (2013.01); *G06F 21/604* (2013.01); *H04L 63/1425* (2013.01)

(58) Field of Classification Search
CPC . H04L 63/1416; H04L 63/1425; G01R 27/16; G06F 21/604
See application file for complete search history.

(56) References Cited

U.S. PATENT DOCUMENTS

| 8,213,321 | B2 * | 7/2012 | Butts ................... H04L 43/0847 370/242 |
| 8,955,130 | B1 | 2/2015 | Kalintsev et al. |
| 9,568,533 | B2 | 2/2017 | Jiang et al. |
| 10,484,425 | B2 * | 11/2019 | Giannopoulos ..... H04L 63/1483 |
| 11,068,590 | B2 * | 7/2021 | Kamir ................. B60R 16/0232 |
| 2011/0158258 | A1 | 6/2011 | Suzuki et al. |

(Continued)

FOREIGN PATENT DOCUMENTS

| EP | 3148153 A1 | 9/2016 |
| EP | 3148154 A1 | 3/2017 |

(Continued)

OTHER PUBLICATIONS

Feb. 24, 2020 European Search Report issued on International Application No. 19203744.

*Primary Examiner* — Kambiz Zand
*Assistant Examiner* — Afaq Ali
(74) *Attorney, Agent, or Firm* — Clements Bernard Walker; Christopher L. Bernard

(57) ABSTRACT

A method of detecting manipulation of data on a Controller Area Network (CAN) bus, and a device performing the method. In an aspect, the method includes detecting manipulation of data on a CAN bus to which the device is connected. The method comprises detecting that bus impedance is below a threshold bus impedance value, detecting whether or not CAN node arbitration currently may occur on the CAN bus upon detecting that the bus impedance is below the threshold bus impedance value, and if not determining that an attempt to manipulate data on the CAN bus has occurred.

12 Claims, 17 Drawing Sheets

(56) References Cited

U.S. PATENT DOCUMENTS

| | | | | |
|---|---|---|---|---|
| 2014/0344930 A1* | 11/2014 | Foley | ................ | H04L 63/1475 |
| | | | | 726/23 |
| 2018/0069874 A1* | 3/2018 | Saeki | ..................... | H04L 12/40 |
| 2019/0245872 A1* | 8/2019 | Shin | ...................... | H04L 12/40 |

FOREIGN PATENT DOCUMENTS

| | | | | | |
|---|---|---|---|---|---|
| EP | 3214803 | A1 | | 9/2017 | |
| EP | 3217602 | A1 | | 9/2017 | |
| EP | 3445003 | A1 | | 2/2019 | |
| EP | 3772839 | A1 | * | 2/2021 | ............. G06F 21/74 |
| GB | 2559431 | A | * | 8/2018 | ......... H04L 49/3072 |
| WO | 2017021970 | A1 | | 2/2017 | |
| WO | 2018146747 | A1 | | 8/2018 | |
| WO | 20190035112 | A1 | | 2/2019 | |

\* cited by examiner

Spoofing
Node 2 sends to Node 3,
pretending to be Node 1

DETECTING MANIPULATION OF DATA ON A CAN BUS

CROSS-REFERENCE TO RELATED APPLICATION

The present disclosure claims the benefit of priority of co-pending European Patent Application No. 19203744.8, filed on Oct. 17, 2019, and entitled "DETECTING MANIPULATION OF DATA ON A CAN BUS," the contents of which are incorporated in full by reference herein.

TECHNICAL FIELD

The present disclosure relates to a method of detecting manipulation of data on a Controller Area Network (CAN) bus, and a device performing the method.

BACKGROUND

The automotive industry have for many years been using message-based communication protocols between electronic control units (ECUs) embedded in motor vehicles and crafts such as cars, boats, trucks, etc. An example of such a protocol is Controller Area Network (CAN). This protocol is standardized by International Standards Organization (ISO). For instance, the CAN protocol used in automotive is defined by ISO standard ISO 11898, consisting of several sub-specifications addressing different parts; for example the CAN datalink layer is defined by ISO 11898-1:2016 and CAN high speed physical layer is defined by ISO 11898-2: 2017. ISO define other CAN protocols as well, which are also used in motor vehicles.

An aspect that has become increasingly relevant in recent years is in-vehicle-network (IVN) security and vehicle data integrity. There are several attack methods like spoofing, tampering, denial-of-service (DOS) that are relevant threats. Some threats are coming from inside vehicle itself in the form of malicious software downloaded to the vehicle, and some threats are coming from external attacker with physical access to the vehicle and its internal communication networks.

As an example, a door lock module could be tampered with by a malicious party with the intent to unlock a vehicle which the malicious party is not authorized to unlock. Any such attacks should be detected and prevented.

Several methods are known for mitigation or prevention of various attacks on the data link layer of CAN bus systems. However, in some examples these methods can be successfully circumvented by performing combined attacks on data link layer and physical layer, when having physical access to a CAN bus.

SUMMARY

One objective is to solve, or at least mitigate, this problem in the art and thus to provide a method of detecting, and possibly preventing, manipulation of data on a CAN bus.

This is performed by a method of a device of detecting manipulation of data on a CAN bus to which the device is connected. The method comprises detecting that bus impedance is below a threshold bus impedance value, detecting whether or not CAN node arbitration currently may occur on the CAN bus upon detecting that the bus impedance is below the threshold bus impedance value, and if not determining that an attempt to manipulate data on the CAN bus has occurred.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
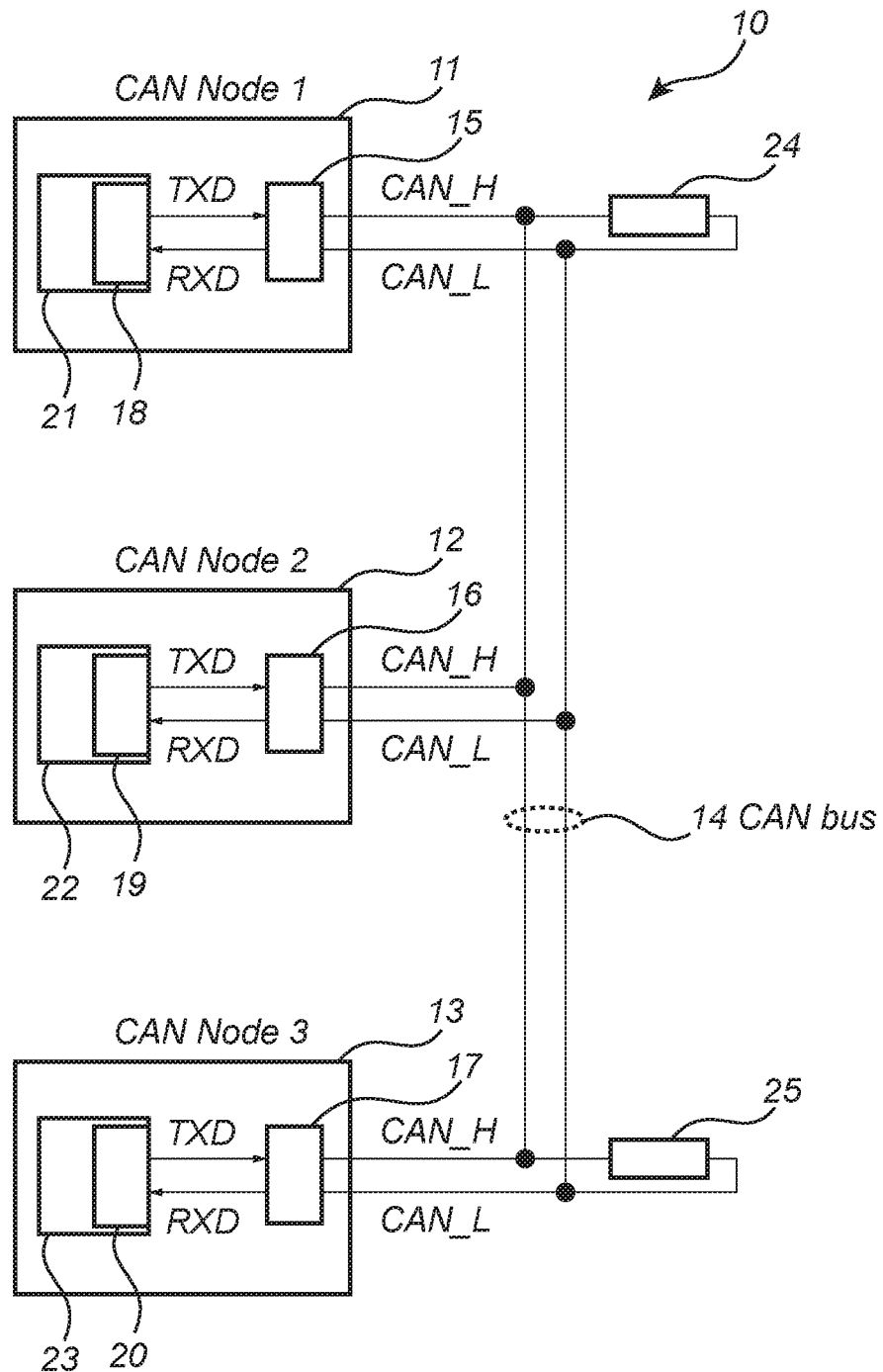
FIG. 1 shows three CAN nodes forming a CAN network in which embodiments may be implemented.

FIG. 1 illustrates three CAN nodes 11, 12, 13 being connected to a linear passive CAN bus 14. A CAN bus is a multi-master serial communication bus which consist of two physical wires, CAN_H and CAN_L, being connected to a respective terminal of each CAN node. All CAN nodes (embodied in the form of e.g. ECUs) in a CAN network 10 are connected to these two wires.

Internally, each CAN node 11, 12, 13 has a bus interface circuit; a CAN transceiver 15, 16, 17. Each transceiver comprises a transmitting part referred to as a bus driver and a receiving part referred to as a bus comparator (not shown).

Each CAN node also has a CAN protocol controller 18, 19, 20 which handles protocol bit stream reception and transmission on data link layer according to ISO 11898-1. A microcontroller 21, 22, 23 is connected to the respective CAN protocol controller 18, 19, 20. The CAN protocol controllers may optionally be a part of the microcontrollers. In a typical linear passive CAN bus 14, there are normally two termination resistors 24, 25 which will be discussed further hereinbelow.

The CAN protocol uses a serial bit stream with values 0 and 1, also known as dominant and recessive bits, which forms CAN data frames, CAN remote frames and other protocol symbols transmitted on the CAN bus 14. A CAN data frame is a "container" in which signals can be transported between two or more CAN nodes. The signals represent useful information shared between CAN nodes, e.g. vehicle speed, brake request, door lock request or similar. ISO-11898-1 define several CAN data frame formats, e.g. Classical Base Frame Format (CBFF), Classical Extended Frame Format (CEFF), Flexible Data-rate (FD) Base Frame Format (FBFF) and FD Extended Frame Format (FEFF).

All CAN nodes 11, 12, 13 are capable of transmitting frames to each other. The CAN protocol controller 18, 19, 20 is handling the reception and transmission of CAN frames. The transmitted bit values 0 and 1 from the CAN protocol controller are converted in the CAN transceiver 15, 16, 17 in each CAN node into two analog voltage levels on the CAN bus 14, which is referred to as recessive and dominant state.

That is, the recessive state is caused by recessive data (bits having value 1) being sent over the bus, while the dominant state is caused by dominant data (bits having value 0) being sent over the bus. These states relate to two voltage ranges on the CAN bus 14. For reception it is the reverse; the CAN transceiver 15, 16, 17 converts the two voltage levels on the CAN bus 14 into suitable levels to the CAN protocol controller 18, 19, 20.

All CAN nodes have a wired-AND connection on CAN_H and CAN_L bus wires; all CAN nodes are directly connected to each other by connecting all the CAN_H wires, and all the CAN_L wires, respectively. Each CAN node 11, 12, 13 can drive the CAN bus 14 into a series of recessive/dominant states, enabling a multi-master communication network according to ISO 11898-1. The CAN protocol data link layer defines how this multi-master sharing of the network is performed, according to a carrier sense multiple access (CSMA) operation.

All data transmitted by the CAN nodes 11, 12, 13 are shared on the CAN bus 14 so all the CAN nodes receive the same stream of bits. If at least one CAN node transmit a dominant bit (logic 0), the CAN bus for all CAN nodes is dominant (logic 0), otherwise the CAN bus is recessive (logic 1).

This means that any CAN node can overwrite a recessive state (1) to become a dominant state (0); this is only allowed in certain restricted situations and is not done regularly for just any CAN frame. A CAN node cannot overwrite a dominant state (0) to become recessive (1). This is how CAN is designed and should operate.

Figure 2:
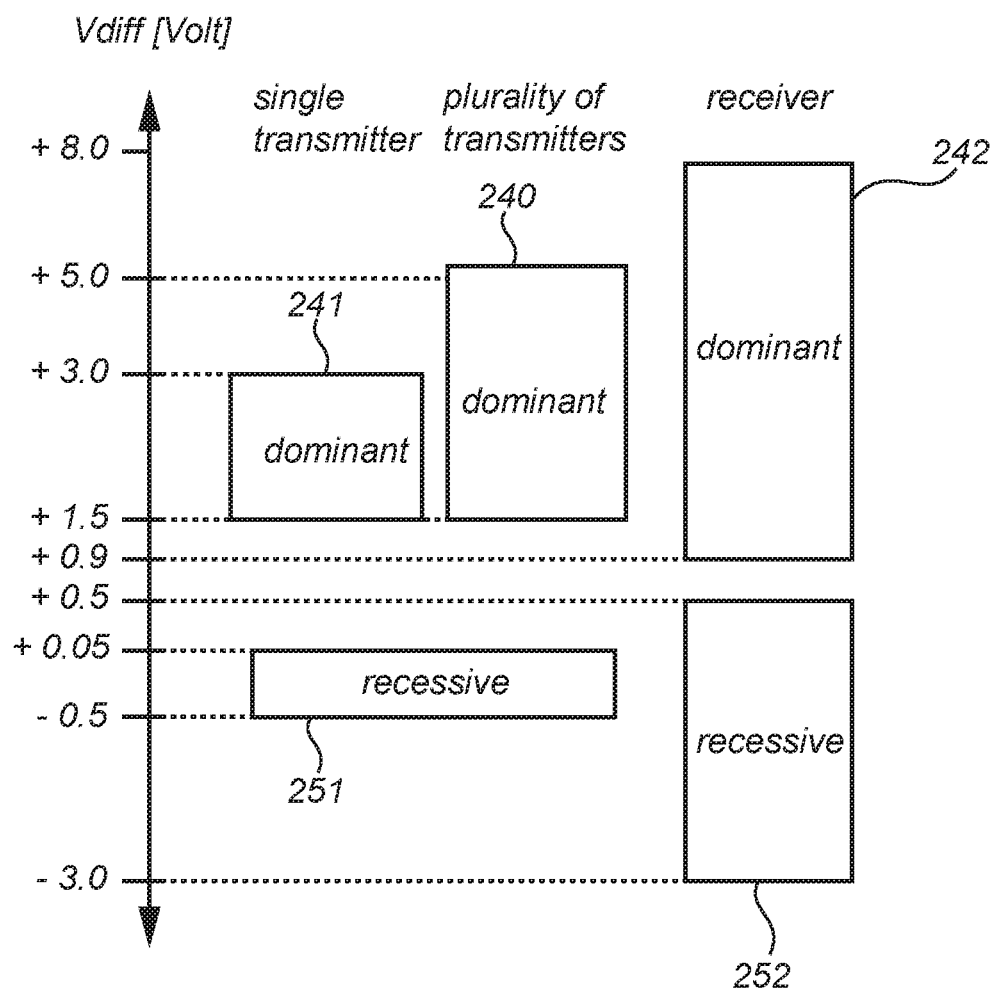
FIG. 2 illustrates stipulated voltage ranges on the CAN bus for recessive and dominant data transferred over the bus, according to standard ISO 11898-2.

FIG. 2 illustrates stipulated voltage ranges on the CAN bus for recessive and dominant data transferred over the bus, according to standard ISO 11898-2.

In FIG. 2 details are shown for expected CAN bus differential voltage (referred to as $V_{diff}$) values measured between CAN_H and CAN_L wires, for the transmitter part of a CAN transceiver (i.e. the bus driver) and the receiver part of a CAN transceiver (i.e. the bus comparator), where $V_{diff}$ is measured as the voltage VCAN_H from bus wire CAN_H to ground, subtracted by the voltage VCAN_L from bus wire CAN_L to ground. The transmitter allowed voltage is in relatively narrow intervals (i.e. intervals 241 and 251) while the receiver must accept wider intervals (i.e. intervals 242 and 252) as recessive and dominant state respectively. This results in receiver tolerance against differences among the $V_{diff}$ voltages of the CAN nodes. The voltage $V_{diff}$ in dominant state must be between +1.5V and +3.0 V on the transmitting CAN node output at normal bus resistance of 50Ω to 65Ω. For a given CAN node, the actual dominant data voltage falls anywhere within this voltage range but is more or less fixed, with slight variation over temperature and loading from bus termination components and impedance of the CAN cables. In some situations, when more than one CAN node simultaneously transmit dominant (up to 32 CAN nodes may be connected to the bus), the $V_{diff}$ voltage can be above +3.0V, as illustrated with range 240. This will be described in more detail in the hereinbelow.

For a population of ECUs (i.e. a CAN node) in a single vehicle or a fleet of vehicles, the $V_{diff}$ dominant voltage may vary from ECU to ECU within the range +1.5V-+3.0V. The variation is due to several reasons like transceiver hardware production tolerances, different transceiver brand designs, temperature, ageing and so on. These many reasons are partly why the allowed range from +1.5V to +3.0V exists, to give a robust and tolerant system even with large differences in voltage levels on the same CAN network.

A receiving ECU being compliant with ISO 11898-2 must accept a voltage $V_{diff}$ between the two CAN terminals from +0.9V to +8.0V as dominant. For a dominant transmit, $V_{diff}$ is in the range from +1.5V to +3.0V; +0.05 to −0.5V for a recessive transmit and +0.5V to −3.0V for a recessive receive. For receiver voltages between 0.5V and 0.9V it is undefined the resulting state but normally there is a recessive-to-dominant and dominant-to-recessive state transition with hysteresis implemented.

Now, when attempting to manipulate a CAN frame, an attacker device will modify bits of a CAN frame transmitted by a vehicle ECU. Any bits of a frame is modified in any direction, from recessive (1) to dominant (0), or from dominant (0) to recessive (1) as needed in order to modify a signal value on the CAN bus 14, e.g. to change a door lock signal from LOCK to UNLOCK.

FIGS. 3-7 show examples of possible attempts to manipulate data sent over the CAN bus 14.

Figure 3:
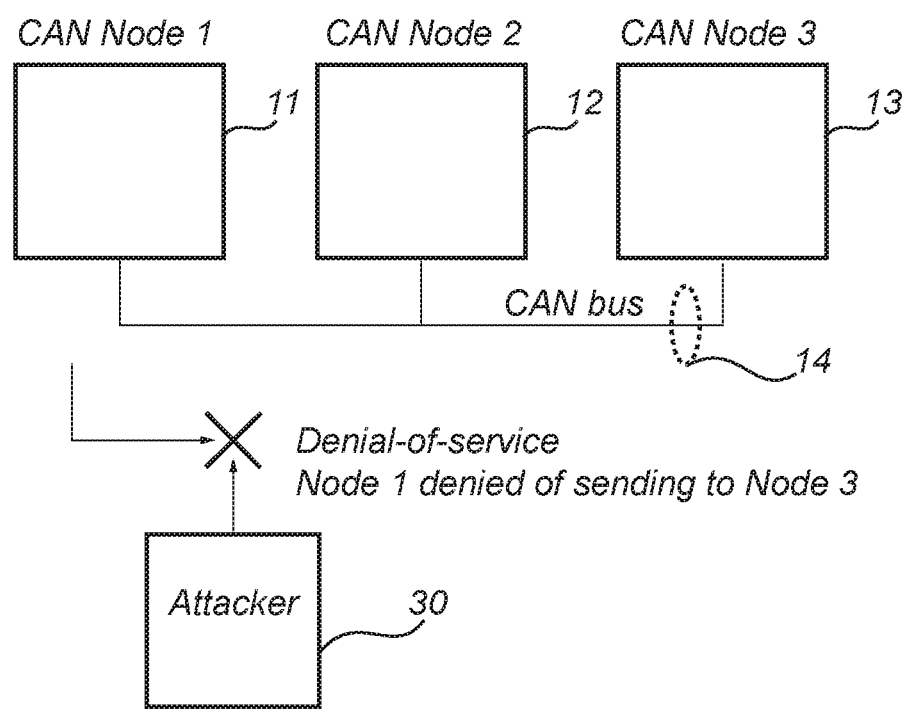
FIG. 3 shows a denial-of-service attack.

FIG. 3 shows a so-called denial-of-service (DOS) attack where an attacker device 30 having access to the CAN bus 14 hinders the first CAN node 11 to send data to second CAN node 12 or third CAN node 13, or to have the data sent by the first CAN node 11 become invalid.

Figure 4:
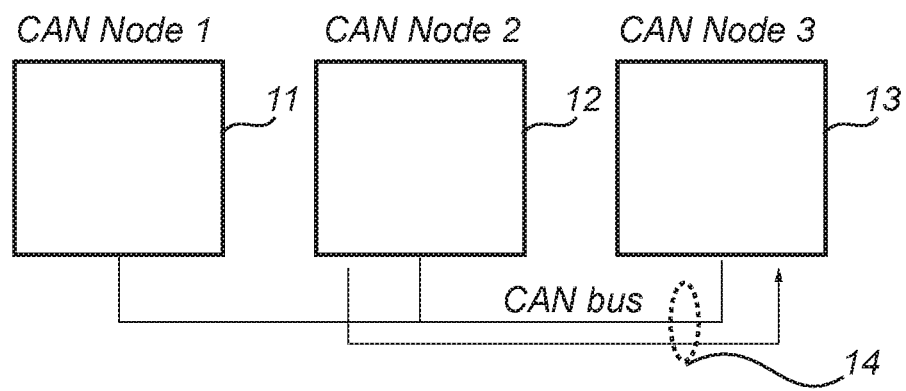
FIG. 4 shows a spoofing attack.

FIG. 4 shows a spoofing attack by the second CAN node 12 pretending to be the first CAN node 1 upon sending data to the third CAN node 13. Hence, an attacker device could be a device already included in the CAN network (being configured with malicious hardware or software) and not necessarily an external attacker device forcefully connecting to the bus.

Figure 5:
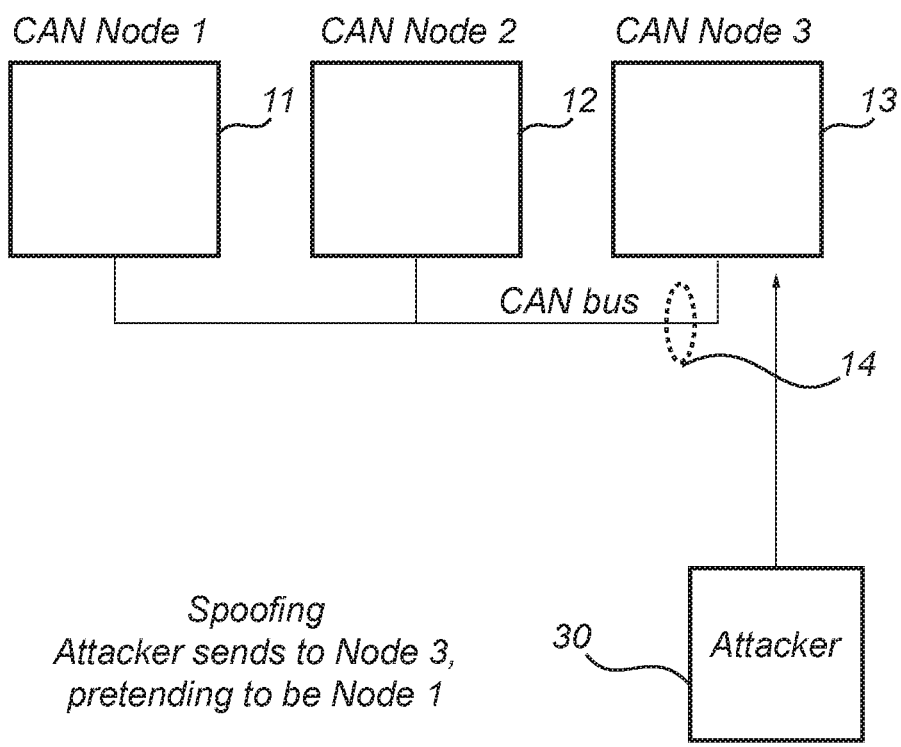
FIG. 5 shows an alternative spoofing attack.

FIG. 5 shows a spoofing attack by an external attacker device 30 pretending to be the first CAN node 11 upon sending data to the third CAN node 13. A spoofed frame may include a manipulated ACK field with ACK bit=0 already indicating acknowledge.

Figure 6:
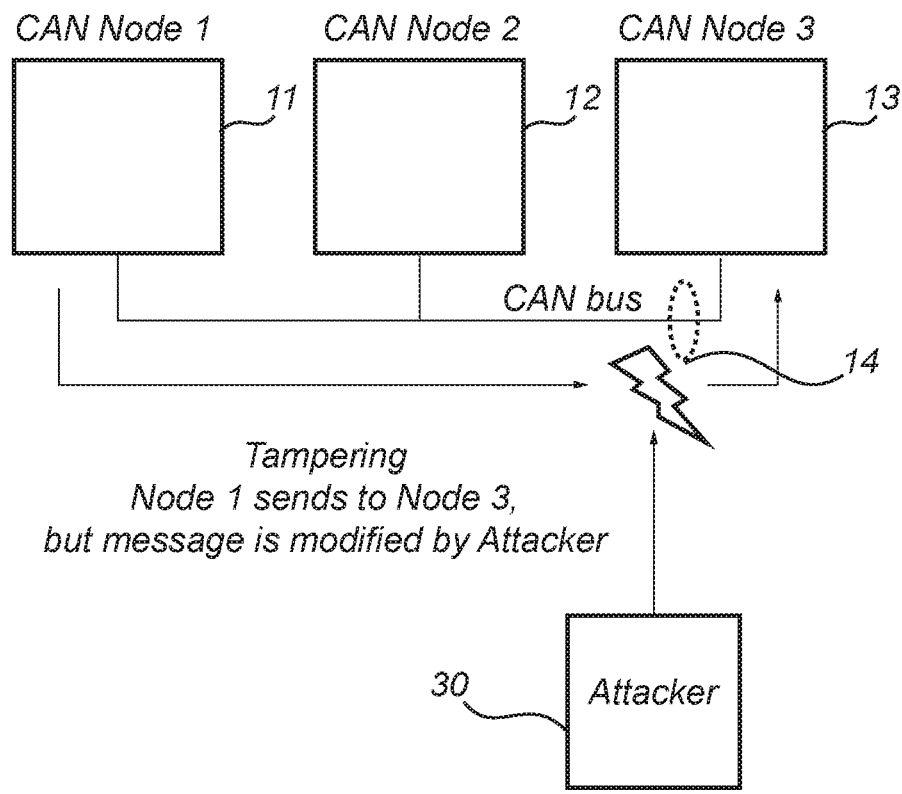
FIG. 6 shows a tampering attack.

FIG. 6 shows a tampering attack by attacker device 30 modifying data sent from the first CAN node 11 to the third CAN node 13. Hence, an attacker device could be a device already included in the CAN network and not necessarily an external attacker device forcefully connecting to the bus.

Figure 7:
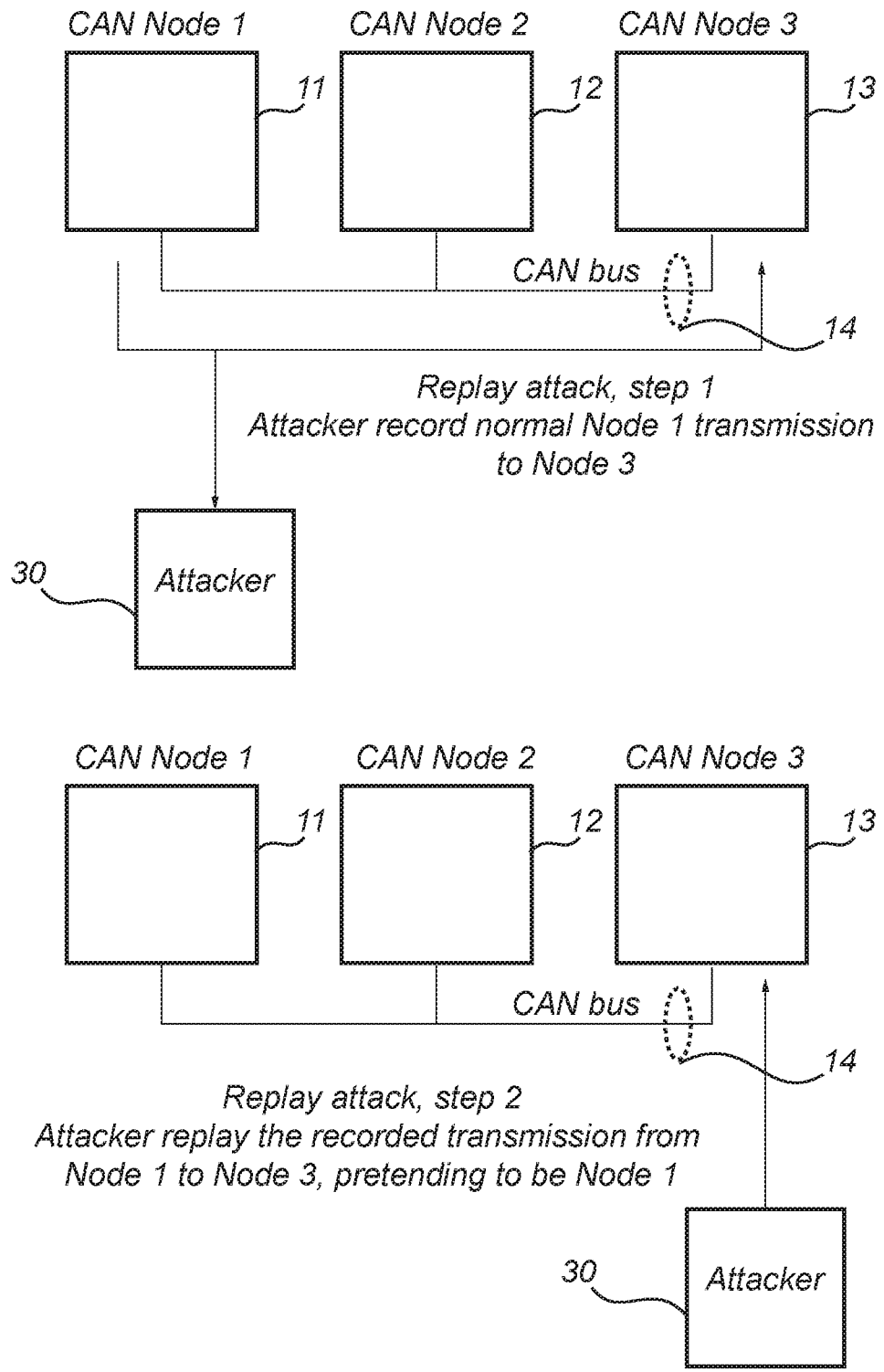
FIG. 7 shows a replay attack.

FIG. 7 shows a so-called replay attack where an attacker device 30 having access to the CAN bus 14 in a first step (top view) records a normal data transmission from the first CAN node 11 to the third CAN node 13. Thereafter in a second step (bottom view), the attacker device 30 replays the recorded data transmission to the third CAN node 13 pretending to be the first CAN node 11.

As can be concluded, numerous ways of manipulating a CAN network may be envisaged. In the following, "manipulation", "modification" and "tampering" will alternatingly be used to illustrate a scenario where an attacker modifies bits of one or more CAN data frames, or creates new CAN data frames, to cause one or more CAN nodes to behave in a particular way or cause the CAN nodes to perform some particular action.

Existing CAN test tools normally used for non-malicious purposes in development and verification in automotive industry can be used as an attacker device in FIGS. 3, 5, 6, 7 when manipulating a CAN network. These tools do not detect CAN bus data manipulation.

Further, existing CAN devices such as diagnostic on-board diagnostics (OBD)-II-dongles, devices for automated generation of driving logbooks, driving style monitoring devices provided by car insurance companies are attached temporarily or permanently to a vehicle CAN bus may be modified for malicious purposes.

As previously described, with a normal CAN transceiver complying with ISO-11898-2, only modification from recessive (1) to dominant (0) is possible; a recessive bus can become dominant, but not the other way around. However, it is possible to design a special-purpose CAN transceiver being capable if modifying data on the CAN bus from dominant (0) to recessive (1).

Thus, taking into account a malicious party potentially manipulating the CAN bus, six scenarios may be envisaged for a CAN transceiver:

normal recessive,
normal dominant,
recessive modified to dominant (tampering),
dominant modified to recessive (tampering),
recessive-to-recessive modification, i.e. bus state does not change (tampering), and
dominant-to-dominant modification, i.e. bus state does not change (tampering).

However, the normal CAN transceiver cannot itself determine whether or not tampering occurs. The CAN transceiver will accept both normal and manipulated frames as long as the differential bus voltage $V_{diff}$ comply with voltage ranges 242 and 252 of FIG. 2 regardless of how these voltages are accomplished.

Figure 8A:
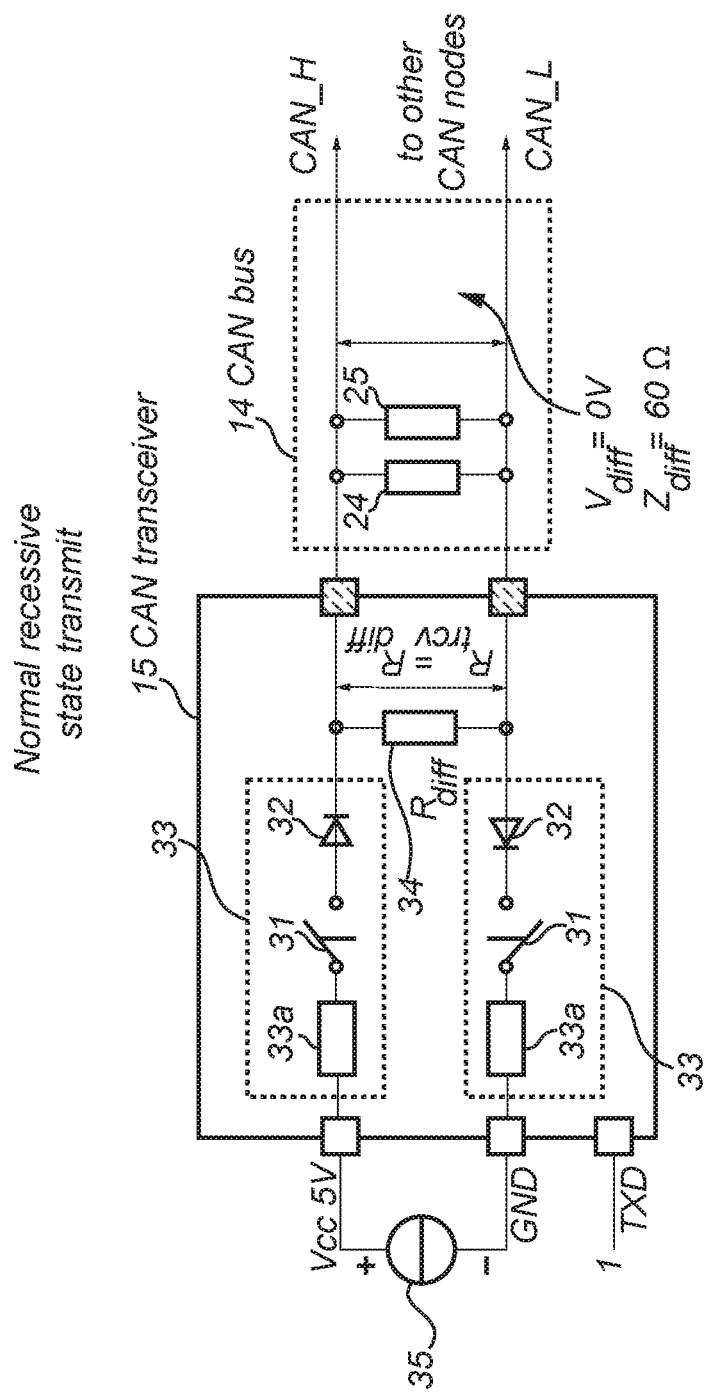
FIGS. 8a and 8b show a schematic view of a transmitter part of a CAN transceiver acting as an interface to a CAN bus.
Figure 8B:
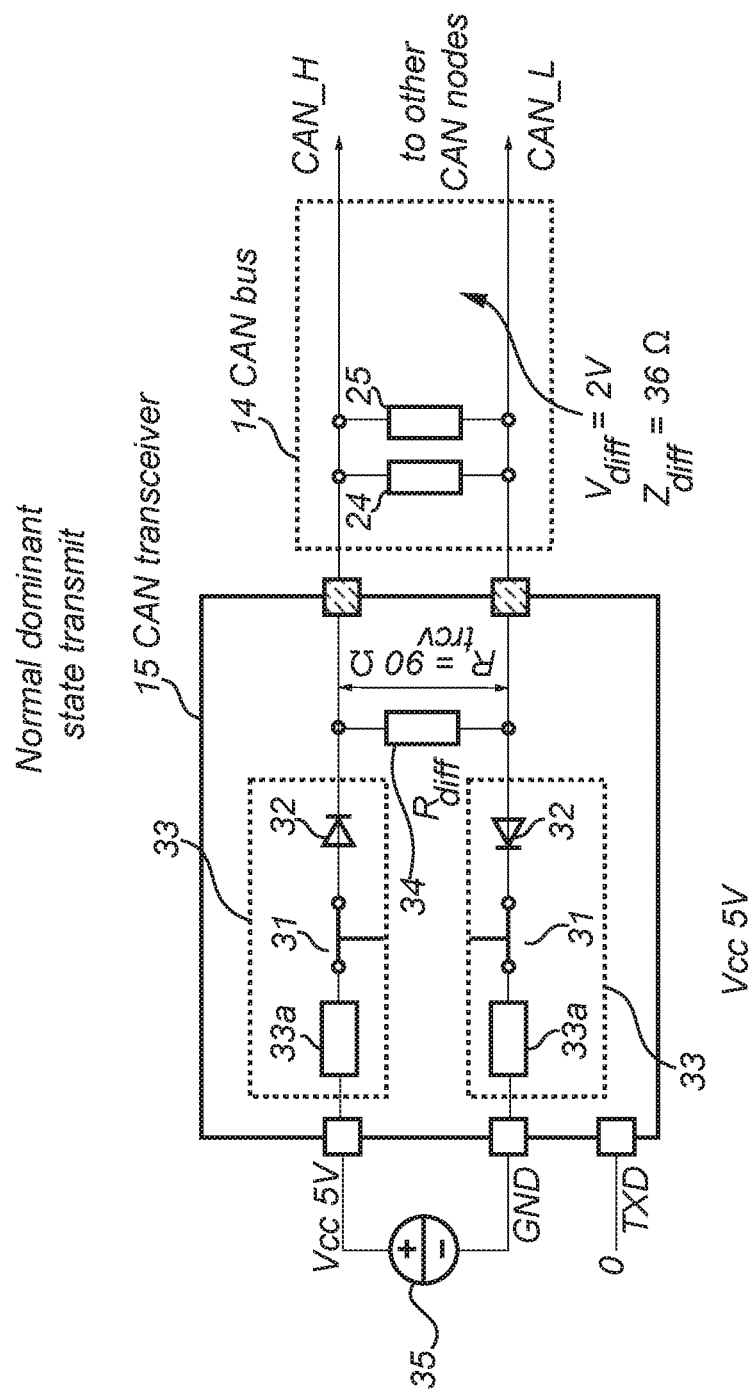

FIGS. 8a and 8b show a schematic view of the transmitter part—i.e. the bus driver—of each CAN transceiver 15, 16, 17 acting as an interface of each CAN node 11, 12, 13 to the CAN bus 14.

In a typical linear passive CAN bus 14 there are normally two termination resistors 24, 25. A typical value of each termination resistance is 120Ω, to match the typical CAN bus cable or transmission line impedance of 120Ω. The following descriptions are based on a configuration of two 120Ω termination resistors 24, 25, a single 60Ω resistor, or any other form of bus resistance of 60Ω accomplished by termination/transceiver components. The invention is not limited to these resistor/impedance values but may be used with any resistance/bus impedance.

Each CAN transceiver have bus biasing resistors 34 that are connected in parallel with the CAN bus, however their resistance is in the order of several kilo-ohms ($R_{diff}$=12 kΩ to 100 kΩ), so the total bus impedance is still mainly dominated by the much lower resistance values of termination resistors 24, 25. The resistance of bus biasing resistors 34 are disregarded in the following as they thus have insignificant influence on bus resistance and bus impedance.

Now, with reference to the circuitry of FIG. 8a, the characteristic differential resistance and impedance of the CAN bus 14 is about 60Ω in normal recessive state during an idle bus state and during transmission of recessive data to the CAN bus 14. In the normal recessive transmit state when field-effect transistor (FET), illustrated with switches 31, is open, since the termination resistors 24, 25 are connected in parallel with CAN_H and CAN_L wires of the CAN bus 14, and the two CAN wires are in parallel, the resulting bus impedance is thus 120×120/(120+120)=60Ω.

Further, with reference to the example circuitry of FIG. 8b, showing the single CAN transceiver 15 transmitting dominant state on the CAN bus 14. A commonly used supply voltage Vcc for normal CAN transceivers used in motor vehicles is +5.0V. A typical $V_{diff}$ dominant drive capability when one CAN node transmit dominant data into a 60Ω bus resistance is +2.0V (although the full +1.5V to +3.0V range is allowed and also used in motor vehicles). In this example the CAN bus impedance and CAN transceiver impedance can be calculated. The CAN transceiver 15 and CAN bus termination resistors 24, 25 form a voltage divider, dividing the CAN transceiver Vcc supply voltage down to a lower voltage $V_{diff}$ on the CAN bus 14.

At +2.0V CAN bus voltage $V_{diff}$ and 60Ω bus resistance, the current through power supply 35, CAN transceiver 15 and termination resistors 24, 25 is 2.0/60=0.033 A. Since Vcc is 5.0V, a total voltage drop of 5.0−2.0=3.0V is created over the CAN transceiver 15 and its bus driver components 31, 32, 33a in both drive stages 33. The internal resistance of the CAN transceiver 15 is about 90Ω since there is a total voltage drop of 3.0V over the transceiver and a current of 0.033 A flows through the transceiver. The transceiver impedance is in this example equal to its internal resistance, it is thus 3.0/0.033=90Ω. In this example the internal resistance and impedance of Vcc voltage supply 35 is around 0Ω and since it is connected in series with each transceiver drive stage 33, 0Ω is added to transceiver internal resistance 90Ω for a total internal resistance and impedance of 90Ω of power supply and transceiver.

The characteristic impedance of the CAN bus 14 in FIG. 8b is about 36Ω in normal dominant transmit state (switches 31 closed), since the internal resistance of 90Ω of the CAN transceiver 15 effectively becomes coupled in parallel with the resistance of 60Ω of the CAN bus 14, and the resulting impedance is thus 60×90/(60+90)=36Ω. It is assumed that the transceiver impedance in any bus state is equivalent to its internal resistance.

The bus driver switches 31, diodes 32, and internal resistance 33a in FIG. 8b is a simplified schematic of the internal components of a bus driver. They form two identical bus driver stages 33. At other resulting dominant bus voltages than the +2.0V shown here (+1.5 to +3.0V allowed according to 241 in FIG. 2), the transceiver internal resistance and resulting CAN bus impedance will be different but still significantly lower than 60Ω in recessive state. For example, at $V_{diff}$=+1.5V the transceiver internal resistance is around 140Ω and connected in parallel with bus resistance 60Ω, resulting in a bus impedance of around 42Ω. At $V_{diff}$=+3.0V the transceiver internal resistance is around 40Ω and connected in parallel with bus resistance 60Ω, resulting in a bus impedance of around 24Ω.

Again, with reference to circuitry of FIG. 8b, another situation can normally occur which is a variation of that previous described for FIG. 8b. In said another situation, there can be a large number of CAN nodes, e.g. up 32 CAN nodes on a CAN bus. Whether or not more than one CAN node will start frame transmission at the same time and participate in arbitration at any given time may be difficult to know beforehand for a CAN network. If the bus is currently not idle and at least two frames becomes queued for transmission in two CAN nodes, they will (following next bus idle detection) participate in an arbitration procedure.

In some examples, several or all CAN nodes can start frame transmission at the same time. When this occur, the so-called Start-Of-Frame (SOF) bit, which is always dominant, and dominant bits in the CAN frame arbitration field are driven dominant by up to 32 CAN nodes at the same time. The ISO-11898-2 specification allows a bus voltage $V_{diff}$ that exceed the normal range of +1.5V to +3.0V, i.e. range 241 in FIG. 2. For multiple transmitters, a bus voltage of up to +5.0V is allowed, i.e. range 240 in FIG. 2. This applies at a bus resistance of 70Ω. In a case where all CAN transceivers have equal output voltage/current capability, since the bus load is shared among all 32 CAN nodes, each CAN transceiver sees an equivalent bus resistance of 70×32=2240Ω (not shown in FIG. 8b).

Typical implementations of CAN bus transceivers used in motor vehicles use two drive stages 33 where the resulting dominant bus voltage is strongly dependent on the bus load. A higher load (lower resistance value of termination resistors) result in lower bus voltage. A lower load (higher resistance value of termination resistors, or driving only a part of the current into the termination resistors as is the case during simultaneous SOF and dominant bits of arbitration field, ACK bit) result in a higher bus voltage.

In case of 32 CAN nodes simultaneous driving dominant and sharing a bus load of 60Ω as in FIG. 8b, instead of 70Ω, a bus voltage below +5.0V can be expected, such as for instance a bus voltage of +4.6V. Each CAN transceiver share the load of the bus resistance and in case of equal voltage/current capability drive an equal amount of current, 4.6/60/32=0.0024 A, the voltage drop over a CAN transceiver using a power supply of +5.0V is 0.4V, and internal resistance of a CAN transceiver is 0.4V/0.0024=167Ω. Since all transceivers are coupled in parallel the resulting parallel internal resistance of all CAN transceivers is 167/32=5.2Ω. The parallel resistance of CAN transceivers becomes coupled in parallel with bus resistance 60Ω, and the resulting CAN bus impedance is 5.2×60/(5.2+60)=4.8Ω. A bus impedance near 4.8Ω is expected also during ACK bit (always dominant) in ACK field where all but one receiver (31 in a network with 32 CAN nodes) simultaneously transmit ACK. In a CAN network with less than 32 CAN nodes a corresponding lower number of CAN nodes transmit ACK and hence resulting bus impedance may be higher than 4.8Ω.

If a dominant bus voltage of +4.0V is achieved during 32 CAN nodes simultaneously transmitting SOF and dominant arbitration bits, assuming each CAN transceiver drive an equal amount of current, 4.0/60/32=0.002 A, the voltage drop over each CAN transceiver is 5.0-4.0=1.0V. Internal resistance of a CAN transceiver is 1.0V/0.002 A=500Ω. The resulting parallel internal resistance of all transceivers is thus 500/32=15Ω. The parallel resistance of CAN transceivers becomes coupled in parallel with bus resistance 60Ω, the resulting bus impedance is thus 15×60/(15+60)=12Ω.

FIG. 8b shows a single CAN transceiver 15 with a single power supply 35. In some examples there may be two power supplies. That is, a separate voltage power supply to upper driver stage 33 related to CAN_H, and a separate voltage power supply to lower driver stage 33 related to CAN_L. The resulting CAN transceiver internal resistance applies here as well, and becomes coupled in parallel with CAN bus 14, and bus impedance is calculated in the same way.

Hence, these are the normal, expected characteristic impedances of the CAN bus 14 for recessive state and dominant state, respectively, during a CAN node transmit operation.

However, during normal operation, a dominant state cannot be forced recessive. With reference again to FIGS. 8a and b, the diodes 32 will only conduct in one (forward) direction, making it possible to force a recessive bus to become dominant, but not the other way around.

When a transmitting CAN node transmits a recessive bit (i.e. with a voltage in range 251 of FIG. 2), this bit is overwritten by an attacker device or any regular CAN node to become a dominant bit (i.e. with a voltage in range 241 of FIG. 2). Hence, this modification of a bit from recessive to dominant can be done by a normal CAN transceiver in the attacker device.

Figure 9A:
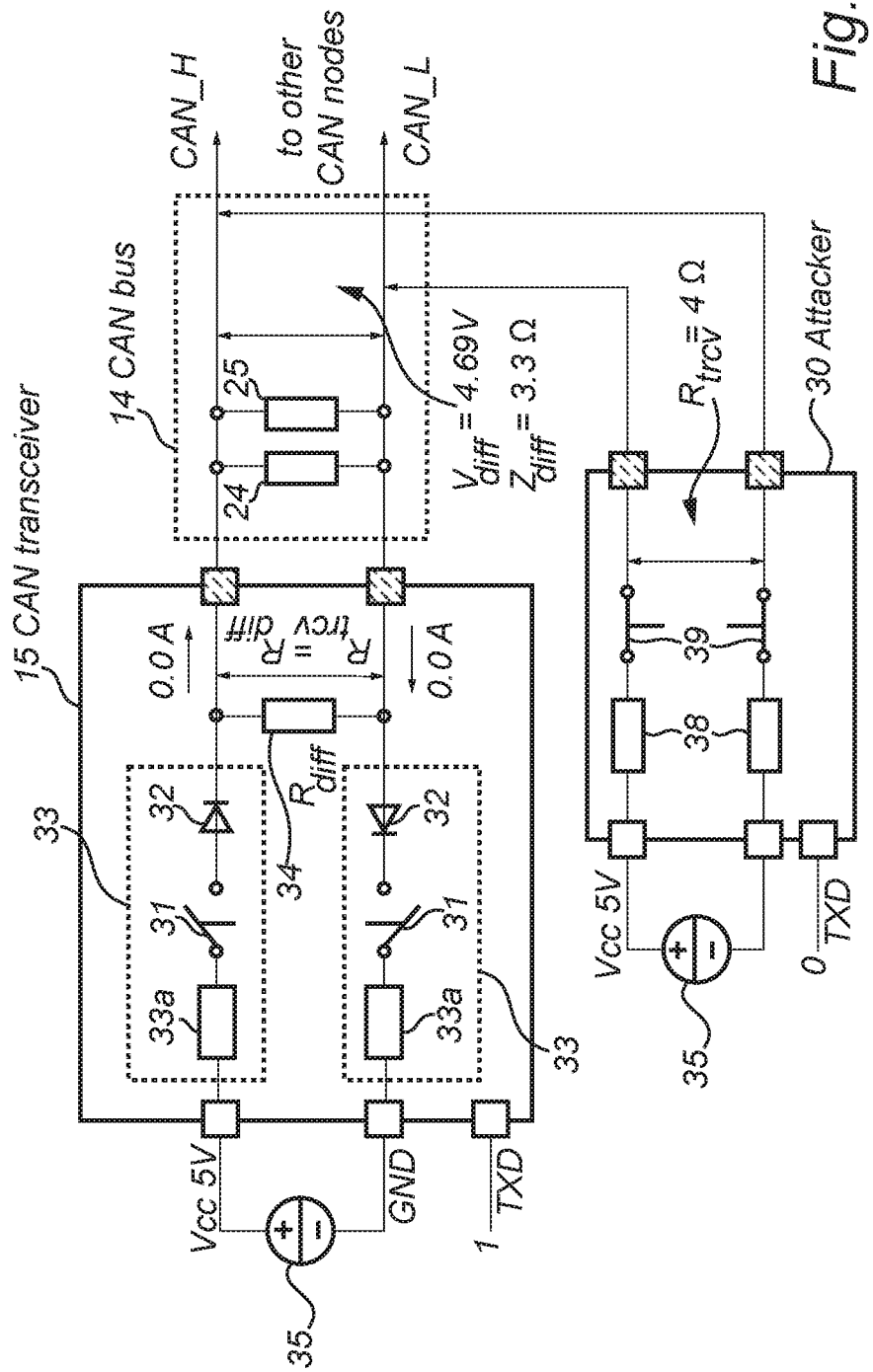
FIGS. 9a and 9b shows an attacker device and a CAN transceiver being connected to a CAN bus.

With reference to FIG. 9a, the attacker device 30 is equipped with a special-purpose CAN transceiver/bus driver that switch a dominant voltage and has low internal resistance and impedance of 4Ω to force a dominant bus state onto the CAN bus 14. The CAN bus resistance is 60Ω. If the attacker transceiver power supply is +5.0V and the total internal attacker transceiver resistance is 4Ω, a current of 5.0/(60+4)=0.078 A flows through the attacker transceiver, CAN bus 14 and termination resistors 24, 25. The resulting total voltage drop over the attacker transceiver is 0.078×4=0.31V. The resulting bus voltage $V_{diff}$ is 5.0-0.31=4.69V, which falls within the dominant receive voltage range of 242 in FIG. 2. The attacker internal resistance becomes coupled in parallel with the bus resistance of 60Ω (resistors 24, 25) of the CAN bus 14, and the resulting bus impedance will thus be 60×4/(60+4)=3.75Ω.

As can be concluded, if the internal resistance of the attacker device is 4Ω, the characteristic impedance of the CAN bus 14 will fall far below 36Ω.

When a transmitting CAN node transmits a dominant bit (i.e. with a voltage in range 241 of FIG. 2), this bit is overwritten by the attacker device to become—and thus be perceived by the other receiving CAN nodes as—a recessive bit (i.e. with a voltage in range 252 of FIG. 2). Such bit modification from dominant to recessive cannot be done by a normal CAN transceiver as explained before.

Figure 9B:
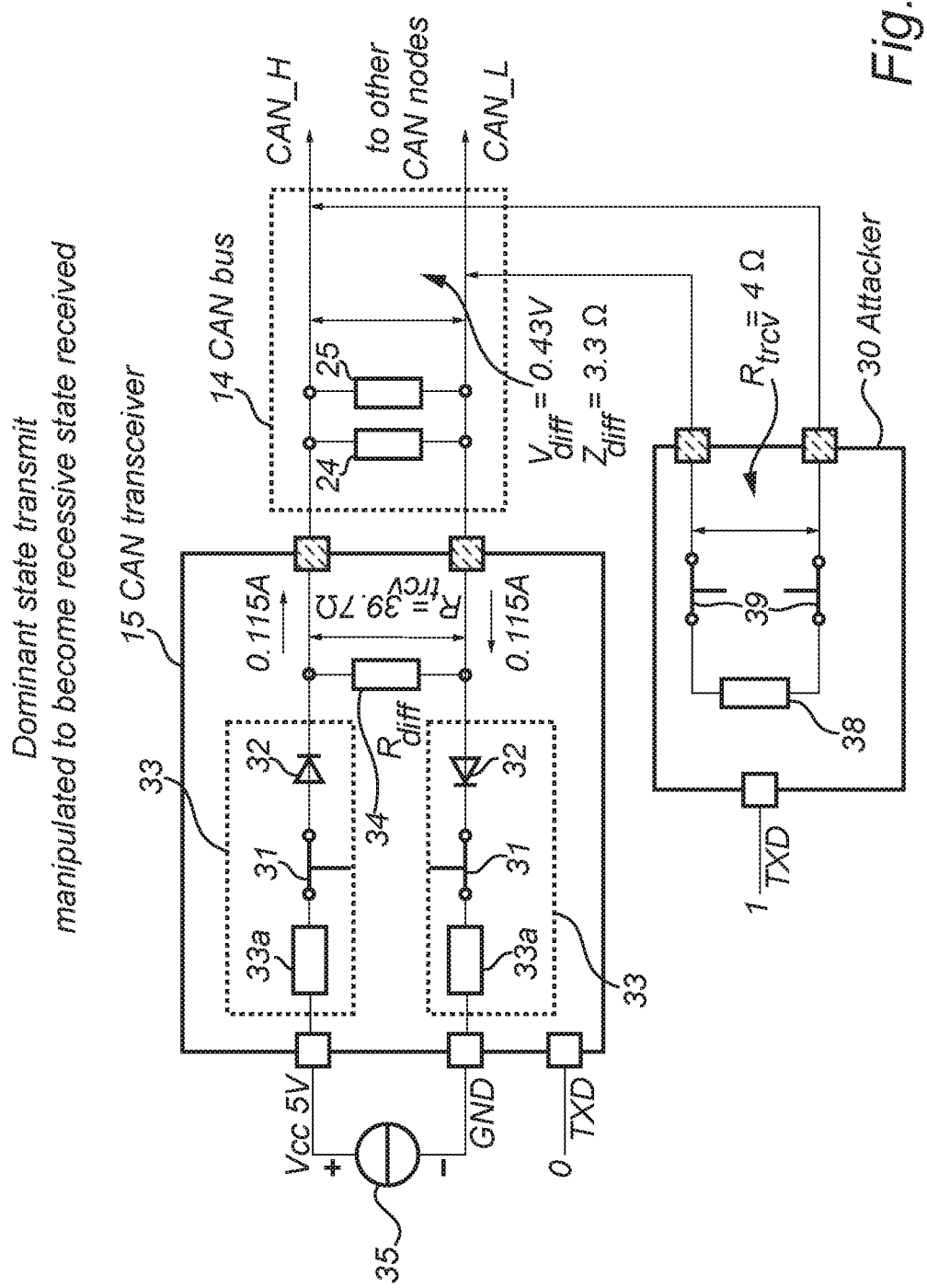

With reference to FIG. 9b, the attacker device 30 thus needs to be equipped with a special-purpose CAN transceiver/bus driver that switch a low impedance load in the order of only a few ohms on the CAN bus 14 to load the CAN transceiver 15 of the CAN node. While providing a dominant bus voltage, this bus load is significantly heavier than what a normal CAN transceiver 15 is designed for and will reduce the differential voltage $V_{diff}$ (from being dominant in the range 242 of FIG. 2) so much that the voltage on the CAN bus 14 will be below 0.5V or even negative and thus recessive (i.e. in the voltage range 252 of FIG. 2).

The special-purpose CAN transceiver of the attacker device 30 may in another example switch a voltage supply with a voltage (not shown) below or under +0.5V or even negative and cause the voltage on CAN bus to be in the recessive range of 252 in FIG. 2. The attacker may in other examples switch a ground potential 0V and a vehicle power supply voltage +12V and cause the voltage on CAN bus to be in the recessive range.

A normal CAN transceiver 15 in a CAN node 11 cannot supply enough current (maximum supply current $I_{CAN\_H}$, $I_{CAN\_L}$ amounts to 115 mA as specified in ISO-11898-2: 2017) to the CAN bus 14 in order to maintain a dominant voltage and win over the attacker device 30 special-purpose CAN transceiver/bus driver low impedance load or low voltage source forcing recessive voltage.

Unfortunately, this constraint on a CAN node may be successfully exploited by the attacker device 30, which can be designed to supply significantly larger currents than 115 mA. The attacker device may intentionally overload the normal CAN transceiver 15 knowing it is guaranteed to provide maximum 115 mA. The attacker device 30 have few physical layer constraints other than that it needs to accomplish the CAN bus voltages of ranges 242/252 of FIG. 2, not necessarily the voltages 241/251.

In FIG. 9b, the attacker device 30 is assumed to have an internal resistance 38 of 4Ω. This resistance becomes coupled in parallel with the bus resistance of 60Ω (resistors 24, 25) of the CAN bus 14, and the resulting bus resistance will thus be 60×4/(60+4)=3.75Ω.

At the maximum allowed normal transceiver dominant state current 115 mA into a bus resistance of 3.75Ω, the normal CAN transceiver provide 0.115×3.75=0.43V, which will not reach the minimum 0.9V threshold for dominant state, i.e. 242 in FIG. 2. Instead, 0.43V fall within the range of recessive voltage, i.e. 252 in FIG. 2. Since the voltage drop over the normal CAN transceiver 15 is 5.0–0.43=4.57V, the internal resistance of the transceiver is 4.57/0.115=39.7Ω. The resulting characteristic impedance of the CAN bus 14 will thus decrease to 39.7×3.75/(39.7+3.75)=3.3Ω. As can be concluded, if the resistance of the attacker device is 4Ω, the characteristic impedance of the CAN bus 14 will fall far below 36Ω.

Hence, if this steep decrease in characteristic impedance of the CAN bus 14 is detected, an attempt to manipulate the CAN bus 14 is considered to have been detected and can thus be warded off, for example by discarding any CAN frames on the bus upon detecting the attempt.

The maximum usable internal resistance 38 of an attacker device 30 connected in parallel with a bus resistance (represented by 24, 25) driven to dominant state by CAN transceiver 15 is determined by the upper threshold of the recessive bus voltage +0.5V of transceiver 15, i.e. range 252 in FIG. 2. At maximum normal transceiver current capability of 115 mA, the total bus resistance is 0.5/0.115=4.3Ω. Since the termination resistance (represented by 24, 25) is 60Ω, maximum attacker device resistance is thus 4.6Ω, since 4.6×60/(4.6+60)=4.3Ω.

In some examples of normal CAN transceivers used in motor vehicles, the maximum bus currents provided at dominant is far below 115 mA. In such case the maximum attacker resistance capable of forcing recessive voltage is therefore higher than 4.6Ω. In some implementations of CAN transceivers used in motor vehicles, an attacker resistance of 5 to 10Ω can force the bus voltage to be recessive.

Further, two more scenarios exist for an attacker. An attacker may not know beforehand what data, recessive or dominant, a transmitting CAN node 15 is about to transmit in e.g. bits of a data field. The attacker may try to force recessive or dominant state on a CAN bus 14 without beforehand considering what CAN node 15 transmits, and some bits may be the same data as transmitted by CAN node 15. In this case the bus state, recessive or dominant, does not actually change but remains the same. However, the bus impedance will be manipulated.

When the CAN node 15 transmits recessive state data, the bus resistance and impedance is 60Ω and the attacker attempts to force recessive state as well, and switch a resistive load of 4Ω which becomes coupled in parallel with the bus. The CAN bus impedance is thus 60*4/(60+4) =3.75Ω.

When the CAN node 15 transmits dominant, the bus impedance is 36Ω. The attacker switches a dominant voltage with a power supply 35 and has an internal resistance of 4Ω which become coupled in parallel with the bus 14. The resulting CAN bus impedance is thus 36*4/(36+4)=3.4Ω. Alternatively since there is a large difference in dominant voltage/current drive capability between the CAN transceiver 15 and the attacker, the CAN transceiver 15 will not be in an operating point where its diodes 32 is operating in a forward mode, hence the normal transceiver 15 does not influence CAN bus impedance, and the attacker will dominate the bus voltage and bus impedance. The CAN bus impedance is thus instead 60*4/(60+4)=3.75Ω.

As can be concluded, in these two scenarios the bus state does not actually change. The characteristic impedance of the CAN bus 14 in recessive state is manipulated and will fall far below 60Ω. The characteristic impedance of the CAN bus 14 in dominant state is manipulated and will fall far below 36Ω.

As can be concluded, similar low CAN bus impedances can be detected in normal situations at transmission of a SOF and during dominant bit transmission in arbitration field, and during transmission of the ACK bit in ACK field by a plurality of CAN nodes.

Existing CAN buses may be terminated by resistors that have lower or much larger resistance values than the previous described 120 Ω+120Ω=60Ω. Termination resistance may be ranging from for instance 45Ω up to hundreds of Ω. The resulting bus voltage, bus current, transceiver currents, transceiver internal impedances, resulting bus impedances, will be different. The voltages or resistance of an attacker device required for bus manipulation may be different but will follow the principles described in before.

Therefore, a device according to an embodiment, is arranged such that it may detect a change in CAN bus impedance (by measuring an appropriate electrical property of the CAN bus 14 such as actual impedance or indirectly by measuring bus voltage and/or current) from a first expected impedance to a second lower impedance. Other electrical properties include for instance bus common mode voltage, single ended bus voltage, single ended bus impedance of either CAN_L or CAN_H wires, etc.

The CAN bus state is determined to be recessive (i.e. at a voltage within range 242 of FIG. 2) or dominant (i.e. at a voltage within range 252 of FIG. 2) based on the actual bus voltage determined by a CAN receiver (bus comparator). The actual bus voltage may or may not be the result of a manipulated bus state by means manipulation of bus resistance or impedance. The determined bus state (recessive or dominant) control an impedance threshold used for determining bus impedance to be normal or a result of manipulation.

Hence, the device according to an embodiment will detect whether the CAN bus impedance is below a predetermined threshold value. If so, the device is given an indication that data on the CAN bus 14 may be manipulated.

Figure 10A:
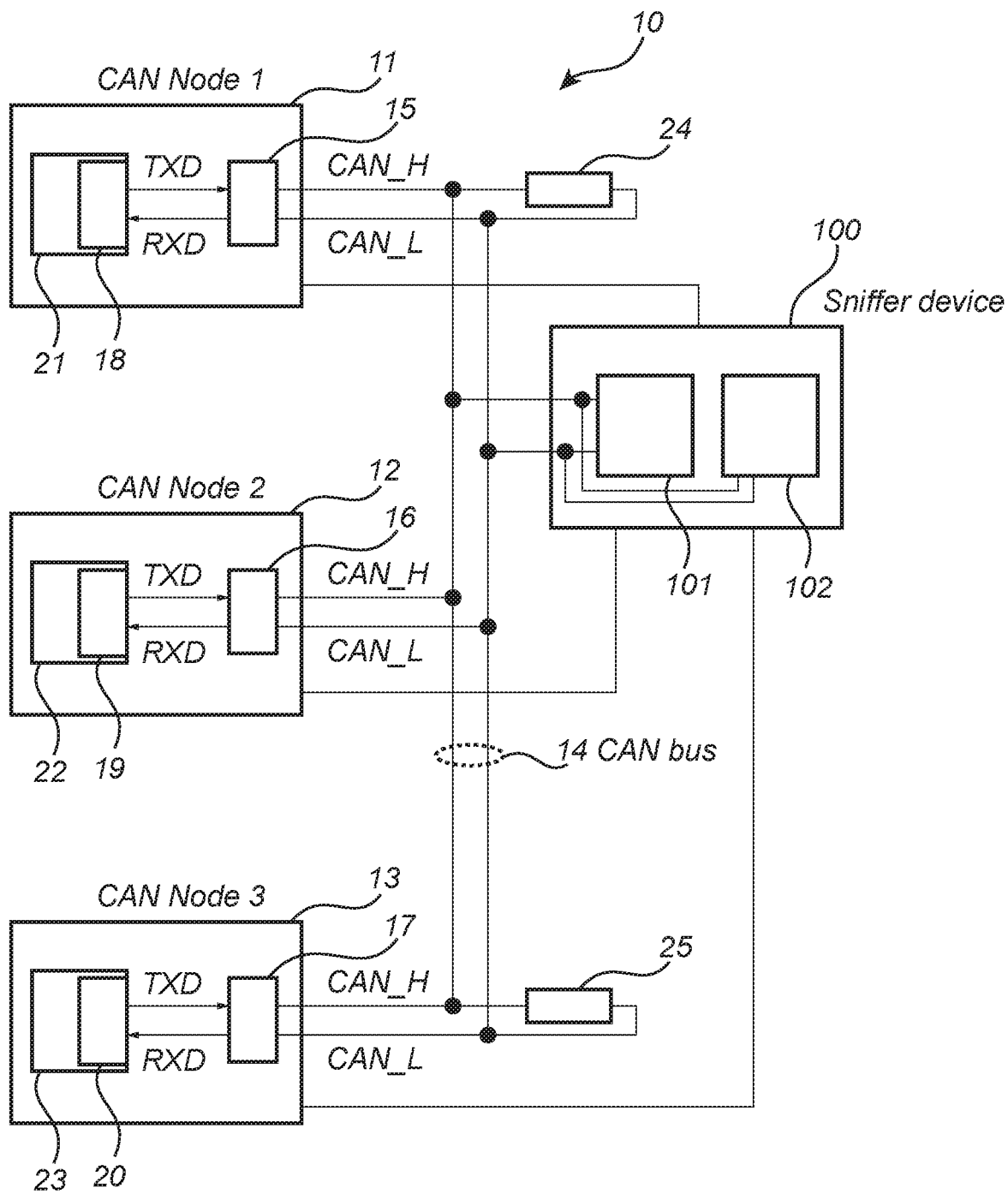
FIG. 10a illustrates a device according to an embodiment configured to detect manipulation of data on a CAN bus to which the device is connected.

In its most basic form, illustrated in FIG. 10a showing the CAN network 10 of FIG. 1, such a device 100 could be embodied as a "sniffer" easily connectable to the CAN bus 14 for detecting the above-discussed change in CAN bus impedance with an impedance detection component 101.

Figure 10B:
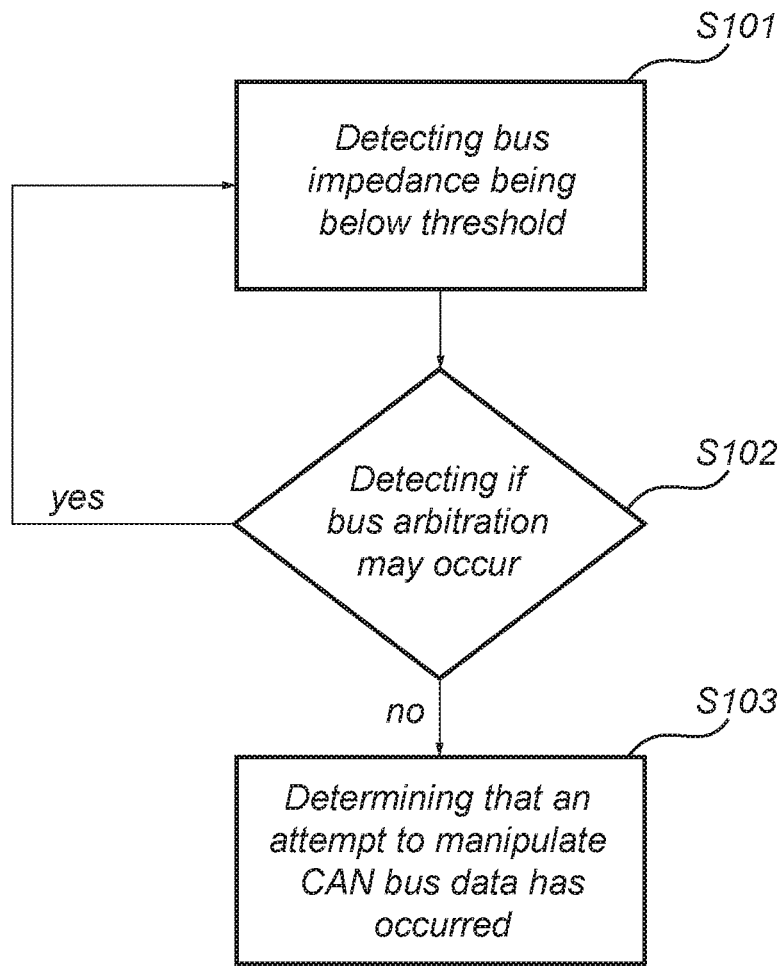
FIG. 10b shows a flowchart of a method of detecting manipulation of data on a CAN bus according to an embodiment.

Reference will further be made to FIG. 10b showing a flowchart illustrating a method of detecting manipulation of data on the CAN bus 14 according to an embodiment.

The sniffer device 100 could thus, upon detecting the steep change in CAN bus impedance in step S101 utilizing the impedance detection component 101, say from a first value of 36Ω down to a second value of about 3-4Ω (as discussed with reference to FIG. 9b), alert each CAN node 11, 12, 13, or some central controller (not shown), whereupon the CAN nodes 11, 12, 13 may conclude that a CAN frame currently being transported over the CAN bus 14 should be discarded. It may for security reasons be decided that a plurality of CAN frames are to be discarded when this decrease in bus impedance is detected. It is noted that the sniffer device 100 does not need to determine that there is a decrease in impedance between two values, but simply needs to conclude that a bus impedance value is below a predetermined threshold value such as e.g. 5Ω or 10Ω.

However, as previously discussed, in some situations upon transmitting CAN data frames over a CAN bus, the bus impedance may decrease significantly from 36Ω to 3-4Ω also during normal dominant state data transmission. Such a situation may occur during transmission of a SOF bit to signal start of a CAN frame transmitted over the CAN bus and the following bus arbitration, since when several CAN nodes simultaneously transmit dominant, their bus drivers are operating in parallel and are therefore reducing the total bus impedance. To solve this, the sniffer device 100 will further be equipped with a CAN frame decoder 102.

Figure 11:
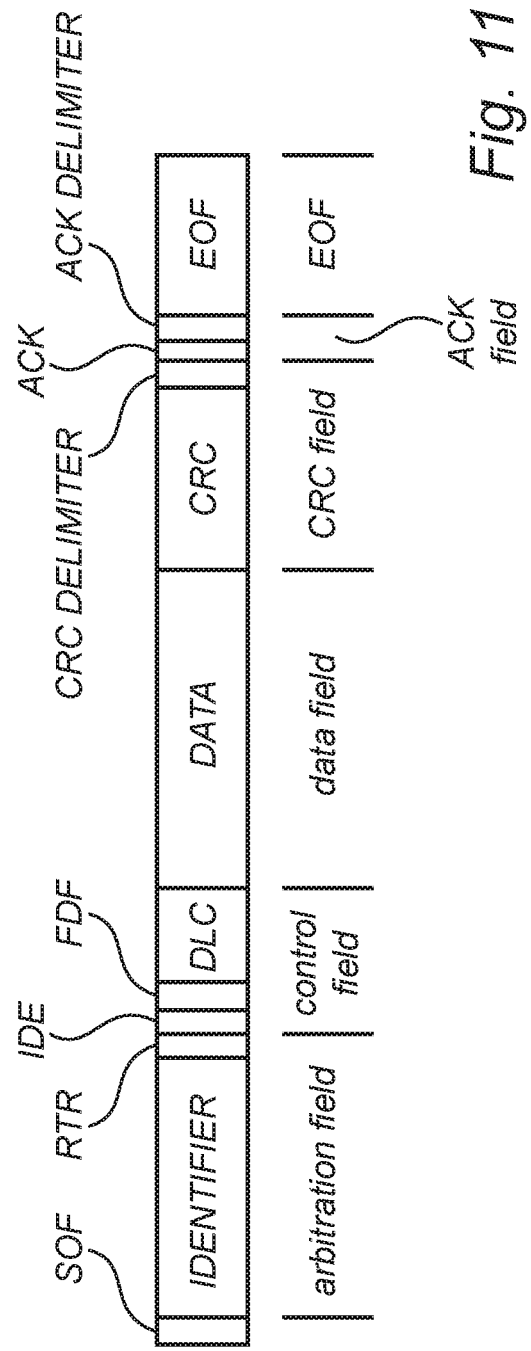
FIG. 11 shows a prior art CAN data frame in a Classical Base Frame Format (CBFF)

Format of a CAN data frame according to the Classical Base Frame Format (CBFF) will be briefly discussed with reference to FIG. 11. Initially, the SOF bit is detected by a CAN node, which indicates the start of the CAN data frame. In the CAN protocol, any dominant bit following a sequence of 11 recessive bits will be interpreted as the SOF bit. Thereafter, the arbitration field is comprised of an 11-bit IDENTIFIER field and a following remote transmission request (RTR) bit. The IDENTIFIER field will identify which CAN node is the transmitter of the CAN frame. In other words, the arbitration occurs during transmission of the IDENTIFIER field and RTR bit (i.e. 12 bits) in order to determine/identify which one out of a plurality of CAN nodes will gain access to the bus for CAN frame transmission.

A CAN data frame according to the CBFF format further comprises an identifier extension (IDE) bit, a flexible data-rate frame (FDF) bit, a 4-bit data length code (DLC) field, up to 64 data bits (in case of a data frame), 15-bit cyclic redundancy checksum (CRC) field, a CRC delimiter bit, an acknowledge (ACK) bit, an ACK delimiter bit, and a 7-bit end-of-frame (EOF) field.

For a CAN data frame according to the CEFF format, the arbitration field is comprised of an 11-bit IDENTIFIER field, a substitute remote request (SRR) bit, an IDE bit, an 18-bit IDENTIFIER extension field and an RTR bit (i.e. 32 bits).

For a CAN data frame according to the FBFF format, the arbitration field is comprised of an 11-bit IDENTIFIER field and an RTR bit (i.e. 12 bits).

For a CAN data frame according to the FEFF format, the arbitration field is comprised of an 11-bit IDENTIFIER field, an SRR bit, an IDE bit, an 18-bit IDENTIFIER extension field and a remote request substitution (RRS) bit (i.e. 32 bits). Hence, in the embodiment of FIGS. 10a and b, the sniffer device 100 will further be equipped with a CAN frame decoder 102, thus being capable of decoding a received CAN frame such that the sniffer device 100 can identify in step S102 whether or not arbitration may occur on the CAN bus 14. That is, the CAN frame decoder 102 will enable the sniffer device 100 to detect in step S102 the SOF bit and the IDENTIFIER bit field in order to determine if the detection that the bus impedance steeply decreases from 36Ω down to around 3-4Ω occurs during possible CAN bus arbitration. If so, the decrease in impedance will not be considered to be the result of a malicious bus manipulation attempt, but a consequence of normal ongoing arbitration on the CAN bus 14 (and continuing impedance measurements would typically be performed). It is noted that the CAN frame decoder 102 of the sniffer device 100 detects the IDENTIFIER field during which arbitration may occur but will not detect the actual arbitration occurring on the CAN bus 14.

However, if the arbitration field data bits already has passed over the CAN bus 14, arbitration can no longer occur and the CAN frame decoder 102 will in step S103 advantageously determine that the steep increase in bus impedance is a result of a manipulation attempt.

It is noted that the sniffer device 100 in this embodiment not must be equipped with a CAN transmitter. Hence, as compared to a normal CAN transceiver as previously has been described, the sniffer device 100 would only have to be equipped with the CAN bus comparator (i.e. CAN receiver), but not with the CAN bus driver (i.e. CAN transmitter), since the sniffer device 100 only receives data from the CAN bus 14 but does not transmit any data to the CAN bus 14. The CAN frame decoder 102 could comprise a CAN protocol controller 18, 19, 20 of the type included in the CAN nodes 11, 12, 13 to decode the received CAN data frames even though the CAN frame decoder 102 used in the sniffer device 100 strictly must not be equipped with any capability for encoding data into CAN frames to be transmitted over the CAN bus 14.

Figure 10C:
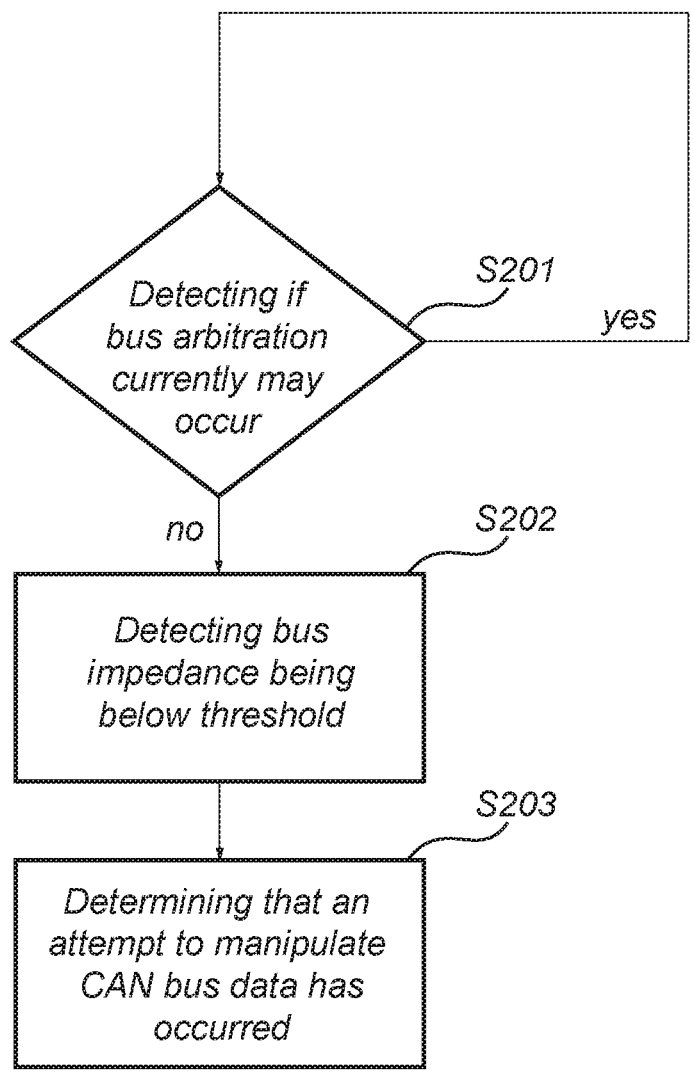
FIG. 10c shows a flowchart of a method of detecting manipulation of data on a CAN bus according to another embodiment.

Alternatively, with reference to FIG. 10c showing a flowchart illustrating a method of detecting manipulation of data on the CAN bus 14 according to another embodiment, it may be envisaged that the sniffer device 100 first detects in step S201 whether or not arbitration may currently occur, and if so, refrain from detecting any change in bus impedance during the potential arbitration procedure currently occurring on the CAN bus 14. Thus, in such an alternative embodiment, detection of bus impedance in step S202 will only be performed as long as no arbitration may be currently ongoing. As previously described, if the sniffer device 100 detects that the bus impedance steeply decreases from 36Ω down to around 3-4Ω in step S202 and no arbitration field is currently encountered (as determined in previous step S201) on the CAN bus—i.e. no IDENTIFIER data and RTR bit are transmitted—a malicious CAN bus manipulation attempt is considered to have been detected in step S203, and the CAN nodes 11, 12, 13, or a central unit, are alerted accordingly such that the attempt can be warded off.

In an embodiment utilizing the CBFF frame format, the CAN frame decoder 102 of the sniffer device 100 detects the SOF bit and thus knows that the following 11 bits belong to the IDENTIFIER field followed by a single RTR bit, the transmission of which signals indicates a potential arbitration occurring. Thus, any dominant data transmitted in the arbitration field potentially indicates an arbitration occurring. A CAN frame decoder is aware of the configuration of the current field of a CAN data frame (or CAN remote frame) being encountered on the CAN bus (arbitration field, control field, data field, etc.). After these 13 bits have passed (i.e. SOF bit, 11-bit IDENTIFIER field and RTR bit), the impedance detection component 101 of the sniffer device 100 will perform the detection of a decrease in CAN bus impedance. Alternatively, any detection of a decrease in CAN bus impedance at dominant state occurring during these 13 bits being transferred on the bus is disregarded. Other frame formats may be used and may include a different length of the arbitration field and identifier field, e.g. CEFF, FEFF, FBFF, as previously described.

In a further embodiment, if this decrease in CAN bus impedance occurs (as indicated by the bus impedance being below a predetermined threshold value) during the ACK bit sent simultaneously on the CAN bus 14 by a plurality of CAN nodes, the decrease is not considered to be a result of CAN bus manipulation as it could occur during normal operation. Alternatively, no impedance detection is performed during the ACK bit being transferred.

In an embodiment, since the bus impedance not necessarily falls from 36Ω to 3-4Ω (as discussed with reference to FIG. 9a), but potentially could fall to just under 10Ω while still being capable of modifying a recessive state to become dominant, the sniffer device 100 will detect that if the bus impedance is below a threshold value of T=10Ω, the bus may be manipulated.

In an embodiment, since the bus impedance not necessarily falls from 60Ω to 3-4Ω (as discussed with reference to Figure gab), but potentially could fall to just under 10Ω while still being capable of modifying a dominant state to become recessive, the sniffer device 100 will detect that if the bus impedance is below a threshold value of T=10Ω, the bus may be manipulated.

An advantage of embodying the device as a sniffer device 100 easily connectable to the CAN bus 14 is that such a device could be added to an already available CAN network 10 without greater modifications.

As will be discussed in some of the following embodiments, the device may be integrated with a CAN transceiver, thus creating an enhanced CAN transceiver capable of full-scale CAN data communication as well as bus impedance detection. However, the sniffer device 100 of FIG. 10a has the advantage that it is relatively non-complex in terms of functionality and is not required to be equipped with all the components of a far more complex CAN transceiver.

Figure 12:
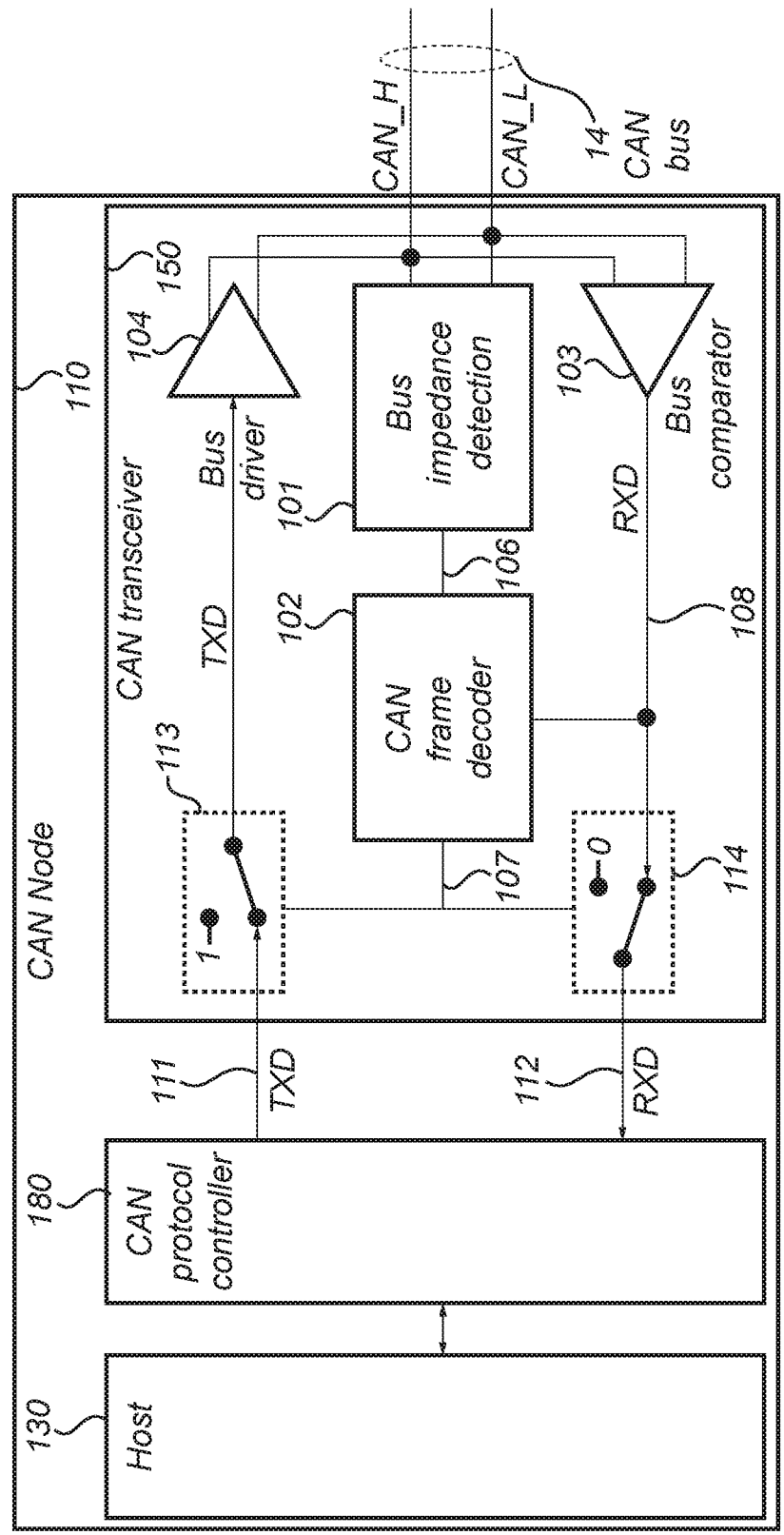
FIG. 12 illustrates a device according to another embodiment configured to detect manipulation of data on a CAN bus to which the device is connected.

FIG. 12 illustrates a further embodiment previously referred to as an enhanced CAN transceiver 150 to be integrated with a CAN node 110, for instance an ECU. Like previously described prior art CAN transceivers 15, 16, 17, the CAN node 110 comprises a CAN protocol controller 180 (cf. CAN protocol controllers 18, 19, 20 of FIG. 1) configured to transport data to/from host 130, being for instance a door lock module or similar. Further similar to prior art CAN transceivers 15, 16, 17, the enhanced CAN transceiver 150 comprises a bus comparator 103 and a bus driver 104 complying with the voltage levels previously described with reference to FIG. 2.

However, in addition to a prior art CAN transceiver, the enhanced CAN transceiver 150 further comprises an impedance detection component 101 similar to the sniffer device 100 according to the embodiment described with reference to FIGS. 10a-c configured to detect if the CAN bus impedance is around 3-4Ω (or at least under 10Ω).

Further similar to the sniffer device 100, the enhanced CAN bus transceiver 150 comprises a CAN frame decoder 102 configured to decode CAN data frames and CAN remote frames transmitted over the CAN bus 14 (and received via line 108) in order to detect a SOF bit and a following IDENTIFIER data field indicating that arbitration may occur. Again, the CAN frame decoder 102 may control the impedance detection component 101 (via line 106) to measure the CAN bus impedance only if the CAN receiver 102 detects that no potential arbitration occurs (i.e. no SOF bit+IDENTIFIER data field and RTR bit are detected on the bus 14), since a steep decrease in bus impedance may occur during normal operation with a SOF bit or IDENTIFIER data field being encountered on the CAN bus 14.

It is noted that the CAN frame decoder 102 may be implemented using a full CAN protocol controller, even though the CAN frame decoder 102 is not used for encoding data into CAN frames to be transmitted over the CAN bus 14 but for decoding CAN data frames received over the CAN bus 14.

Now, if the CAN frame decoder 102 in cooperation with the impedance detection component 101 detects that bus impedance is below a threshold value when no arbitration can occur (cf. steps S011 and S102 of FIG. 10b or steps S202 and S201 of FIG. 10c), i.e. outside of the SOF bit and the IDENTIFIER data field and RTR bit being encountered, a malicious CAN bus manipulation attempt is considered to have been detected (cf. step S103 of FIG. 10b or step S203 of FIG. 10c).

For a normal, untampered CAN bus there is a need for non-interference with the transmission and reception of normal CAN data frames from the CAN controller 180 to and from the CAN bus 14. This concerns e.g. the timing properties of frames and data content of frames. Received CAN data frames will thus pass via the bus comparator 103 to the CAN protocol controller 180 via RXD line 112. The CAN protocol controller 180 will then pass payload data of the CAN data frame (i.e. the DATA field of the frame illustrated in FIG. 11) to the host 130. Transmitted CAN frames will pass from CAN controller 180 via TXD line 111 to the bus driver 104 and to the CAN bus 14.

However, in an embodiment, to avoid any potentially manipulated CAN data reaching the CAN protocol controller 180 and ultimately the host 130, a first switch 114 is introduced which can be controlled by the CAN frame decoder 102 in case any manipulation attempt is detected as previously described. Hence, should the CAN frame decoder 102 detect a manipulation attempt, the CAN frame decoder 102 may discard the potentially manipulated CAN frame by controlling the first switch 114 via line 107 such that the CAN protocol controller 180 receives dominant data e.g. an error flag (EF) comprised of at least six consecutive bits (represented by "0") instead of the potentially manipulated CAN data frame(s).

Optionally, a second switch is 113 introduced to avoid any erroneous response from the CAN protocol controller 180 transmitted via TXD line 111. Thus, should the CAN frame decoder 102 detect a manipulation attempt, the CAN frame decoder 102 may discard a response signal from the CAN protocol controller 180 by controlling the second switch 113 via line 107 to output recessive data (represented by "1") to the CAN bus 14 via the bus driver 104.

Since a received frame is to be approved or disapproved based on the bus electrical properties, and the enhanced CAN transceiver 150 must preserve the timing and content of untampered frames, it must initially allow reception of the beginning of a received frame until the frame is later possibly detected as tampered; that can only be determined after the part of the CAN frame constituting the SOF bit and the IDENTIFIER data field+the RTR bit have been decoded by the CAN frame decoder 102 and the same part already has been passed on to the CAN protocol controller 180. If the CAN frame is not detected to be manipulated, the complete CAN frame must be passed transparently until its end. Therefore, there is a need for determining the start of a new received frame, which a CAN frame decoder 102 (possibly implemented using a full CAN protocol controller) indeed is capable of doing.

The CAN data link protocol defined in ISO-11898-1 define an approach of signalling errors (invalidating received frames) when errors are detected (e.g. CRC error, stuff error, format error) on the data link layer. If a received CAN data frame is detected to have been tampered with, this decision is made during the tampered bit or a bit following closely after the bit having been tampered with. Such decision must always be made before the CAN frame has ended in order to prevent the CAN frame from being considered valid and received by CAN controller 180.

For a manipulated frame, the ISO-11898-1 approach of invalidating a received frame is in an embodiment used also by the enhanced CAN transceiver 150 to discard a possibly manipulated received CAN frame. This invalidation is internal in the CAN transceiver 150 and CAN node 110 and is not transmitted on the CAN bus 14. When the received CAN frame is detected to have been tampered with by the CAN frame decoder 102 cooperating with the impedance detection component 101, the CAN frame decoder 102 controls the first switch 114 to discard the received CAN frame by effectively destroying the CAN frame passed via RXD line 112 by overwriting the CAN frame with an error flag (EF) that present a logic 0 for a duration of at least six consecutive bits duration. Preferably the error flag is extended beyond six bits or until the end of CAN data frame has been encountered on the bus 14, as determined by the CAN frame decoder 102.

Overwriting the remainder of the CAN frame in this way will a) prevent the CAN protocol controller 180 from receiving the frame as a valid frame and will thus prevent the frame content to be passed from the CAN protocol controller 180 and onto the host 130, and b) have the CAN protocol controller 180 not detect bus idle before the end of frame has been encountered and thereby wait with any pending frame transmission until the CAN bus 14 is idle. The host 130 will be unaware of any tampered CAN frame. There may optionally be a notification signal from the CAN frame decoder 102 to the host 130 when a manipulated CAN frame has been detected. This may be used by the host 130 to perform a suitable step, e.g. to change an operational state of the host or any other appropriate action.

The CAN frame decoder 102 may in an optional embodiment, while invalidating the received CAN frame on RXD signal 112, acknowledge the tampered CAN frame on the CAN bus 14 by transmitting a dominant bit on the TXD signal 111 during ACK bit in ACK field. This will hide the detection of a tampered CAN frame by CAN transceiver 150 to an attacker or any other CAN node on the CAN bus 14. Thus, CAN node 110 will appear to accept the tampered frame while internally actually discarding it.

In an embodiment, the impedance detection component 101 may sense the CAN bus impedance during bit reception of a CAN frame which coincide with one or more bit time segments defined by ISO-11898-1; Sync_Seg, Prop_Seg, Phase_Seg 1, Phase_Seg 2 or around the sampling point. Impedance sensing may also be continuous.

In an embodiment, CAN bus impedance detection may be performed such that it does not timewise coincide with transitions of the bus state from dominant-to-recessive or recessive-to-dominant, or it is not performed at a predetermined time thereafter.

Other CAN protocols than ISO-11898-1 and ISO-11898-2 may be used.

As can be concluded from this embodiment, normal untampered CAN data frames may transparently be passed to and from a host 130 and a CAN bus 14, while any CAN data frame(s) detected to potentially be manipulated is blocked from reaching the host 130 (and/or the CAN bus 14), thereby preventing tampering and any following vehicle malfunction.

In an alternative embodiment, again with reference to FIG. 12, an alternative usage is envisaged. For instance, a vehicle system designer or original equipment manufacturer (OEM) may want to allow activation of certain function or vehicle mode via CAN bus communication and only when having physical access to the vehicle for security or safety reasons, e.g. in a workshop or during R&D development. Other reasons may be to unlock, disable or enable certain vehicle functionality only under strictly controlled situation, and that may be subject to commercial or data integrity reasons for the OEM, e.g. increasing propulsion system performance (torque, horsepower) or reading sensitive vehicle data. In such situations, it may be possible to in fact want to test robustness of the CAN network or how the CAN network reacts to malicious attacks.

Thus, instead of discarding any detected manipulated CAN data frames (provoked by the vehicle system designer or the OEM), the CAN receiver 102 detects the manipulated CAN data frames and controls the first switch 114 to forward the manipulated CAN data frames instead of discarding the frames. It could even be envisaged that manipulated CAN frames are forwarded to the CAN protocol controller 180 and further on to the host 130 while the normal, non-manipulated CAN data frames are discarded.

As has been shown in FIGS. 10a and 12, the sniffer device 100, and the enhanced CAN transceiver 150, respectively, comprises functionality such as impedances detection 101 and CAN frame decoding 102, which may be implemented using an appropriate component(s).

Figure 13:
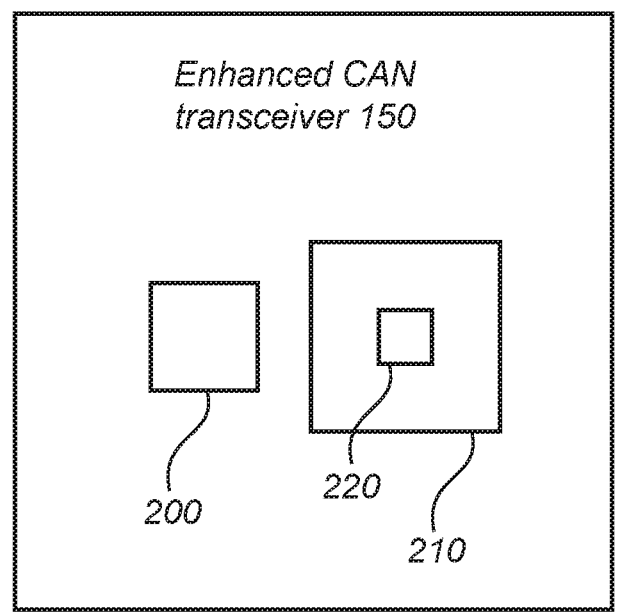
FIG. 13 illustrating a device according to an embodiment.

With reference to FIG. 13, the devices according to embodiments ~represented here by the enhanced CAN transceiver 150—comprise one or more processing units 200 in which parts or all of the functionality described hereinabove of may be implemented. Typically, all functionality of the enhanced CAN transceiver 150 may be carried out by such processing unit(s) 200, such as that of the CAN frame decoder 102, the bus impedance detector 101, switches 113, 114, etc.

The steps of the method of the CAN transceiver 150 (or sniffer device 100) of detecting manipulation of data on a CAN bus to which the device is connected according to embodiments may thus in practice be performed by the processing unit 200 embodied in the form of one or more microprocessors arranged to execute a computer program 220 downloaded to a suitable storage medium 210 associated with the microprocessor, such as a Random Access Memory (RAM), a Flash memory or a hard disk drive. The processing unit 200 is arranged to cause the device 150 to carry out the method according to embodiments when the appropriate computer program 220 comprising computer-executable instructions is downloaded to the storage medium 210, being e.g. a non-transitory storage medium, and executed by the processing unit 200. The storage medium 210 may also be a computer program product comprising the computer program 220. Alternatively, the computer program 220 may be transferred to the storage medium 210 by means of a suitable computer program product, such as a Digital Versatile Disc (DVD) or a memory stick. As a further alternative, the computer program 220 may be downloaded to the storage medium 210 over a network. The processing unit 200 may alternatively be embodied in the form of a digital signal processor (DSP), an application specific integrated circuit (ASIC), a field-programmable gate array (FPGA), a complex programmable logic device (CPLD), a system basis chip (SBC), etc.

The CAN transceiver 150 may be an Integrated Circuit (IC) packaged device with a bus driver and a bus comparator in the same IC package. Alternatively, the transceiver 150 may be constructed by a plurality of passive components and by linear or digital semiconductor components. The bus driver 104 and bus comparator 103 may be embodied by an Integrated Circuit (IC) in the same IC package, for instance a prior art CAN transceiver, and bus characteristics sensor 101, CAN frame decoder, 102, switches 113, 114 may be separate the from the transceiver IC package.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of detecting manipulation of data on a Controller Area Network, CAN, bus to which a device is connected, the method comprising:
   detecting that bus impedance is below a threshold bus impedance value;
   detecting whether or not CAN node arbitration currently may occur on the CAN bus upon detecting that the bus impedance is below the threshold bus impedance value by detecting occurrence of a Start-Of-Frame, SOF, bit on the CAN bus, wherein during a predetermined number of bits immediately following the SOF bit arbitration may occur, or detecting that data frame acknowledgement, ACK, currently occurs on the bus; and if not
   determining that an attempt to manipulate data on the CAN bus has occurred.

2. The method of claim 1, further comprising:
   discarding at least one current data frame being received over the CAN bus following the determination that an attempt to manipulate data on the CAN bus has occurred.

3. The method of claim 2, wherein the discarding of the at least one current data frame comprises:
   overwriting a remainder of said at least one current data frame with zeros, or overwriting at least six consecutive bits following a first bit detected to be manipulated for the data frame; and
   passing the overwritten at least one current data frame on to a CAN protocol controller to which the data frame is intended.

4. The method of claim 1, further comprising:
   passing at least one current data frame having been determined to be manipulated on to a CAN protocol controller to which the data frame is intended.

5. The method of claim 1, the threshold bus impedance value being 10 Ω.

6. A device configured to detect manipulation of data on a differential-voltage bus to which the device is connected, which device comprises a processing unit and a memory, said memory containing instructions executable by said processing unit, whereby the device is operative to:
   detect that bus impedance is below a threshold bus impedance value;
   detect whether or not node arbitration currently may occur on the bus upon detecting that the bus impedance is below the threshold bus impedance value by detecting occurrence of a Start-Of-Frame, SOF, bit on the CAN bus, wherein during a predetermined number of bits immediately following the SOF bit, it is detected that arbitration may occur, or detecting that data frame acknowledgement, ACK currently occurs on the bus; and if not
   determine that an attempt to manipulate data on the bus has occurred.

7. The device of claim 6, further being configured to:
   discard at least one current data frame being received over the CAN bus following the determination that an attempt to manipulate data on the CAN bus has occurred.

8. The device of claim 7, further being operative to, when discarding the at least one current data frame:
   overwrite a remainder of said at least one current data frame with zeros, or overwriting at least six consecutive bits following a first bit detected to be manipulated for the data frame; and
   pass the overwritten at least one current data frame on to a CAN protocol controller to which the data frame is intended.

9. The device of claim 6, further being operative to:
   pass at least one current data frame having been determined to be manipulated on to a CAN protocol controller to which the data frame is intended.

10. The device of claim 6, the threshold bus impedance value being 10 Ω.

11. A non-transitory computer-readable medium comprising computer-executable instructions stored in a memory for causing a device to perform the method recited in claim 1 when the computer-executable instructions are executed on a processing unit included in the device.

12. A computer program product comprising a non-transitory computer-readable medium, the non-transitory computer-readable medium having the computer program according to claim 11 embodied thereon.

* * * * *